United States Patent [19]

Lüpertz

[11] 4,335,806

[45] Jun. 22, 1982

[54] SPOT-TYPE DISC BRAKE HAVING A SIMPLE GUIDING ARRANGEMENT FOR THE CALIPER AND SHOES AT THE CARRIER

[75] Inventor: Hans-Henning Lüpertz, Darmstadt, Fed. Rep. of Germany

[73] Assignee: ITT Industries, Inc., New York, N.Y.

[21] Appl. No.: 162,691

[22] Filed: Jun. 24, 1980

[30] Foreign Application Priority Data

Jul. 3, 1979 [DE] Fed. Rep. of Germany ....... 2926818

[51] Int. Cl.³ ............................................. F16D 65/04
[52] U.S. Cl. .................. 188/73.33; 188/72.4; 188/73.38; 188/73.39; 188/73.45
[58] Field of Search ................. 188/73.45, 72.4, 73.44, 188/73.46, 73.43, 73.39, 73.38, 73.32, 73.33, 73.31, 73.34, 73.42, 73.41, 250, 370

[56] References Cited

U.S. PATENT DOCUMENTS 3,368,647  2/1968  Laverdant .......................... 188/73.39
4,194,597  3/1980  Evans et al. .................. 188/73.39 X

FOREIGN PATENT DOCUMENTS 2419511 11/1974  Fed. Rep. of Germany ... 188/73.39
2538017  3/1976  Fed. Rep. of Germany .
2548927  5/1976  Fed. Rep. of Germany .
1121593  7/1968  United Kingdom ............. 188/73.39

*Primary Examiner*—Douglas C. Butler
*Attorney, Agent, or Firm*—John T. O'Halloran; Alfred C. Hill

[57] ABSTRACT

An arrangement of guiding a caliper of a floating caliper disc brake comprising two axial pins fixed to a carrier member and projecting away from the disc through guiding openings in the caliper. At the other side of the disc the caliper is detachably fixed to a brake pad having a backing plate which is axially slidably arranged between two arms extending from the carrier beyond the edge of the disc, the backing plate being locked in the radial direction at one of the two arms. This guiding arrangement avoids clamping forces and allows easy replacement of the brake pads.

67 Claims, 4 Drawing Figures

SPOT-TYPE DISC BRAKE HAVING A SIMPLE GUIDING ARRANGEMENT FOR THE CALIPER AND SHOES AT THE CARRIER

BACKGROUND OF THE INVENTION

The present invention relates to a spot-type disc brake with a brake carrier and a floating caliper, which is axially displaceably guided at the brake carrier, embraces the brack disc in a clamping manner, carries on one side of the brake disc the brake cylinder/brake piston unit and the inside brake shoe, carries on the other side of the brake disc the outside brake shoe, and has two loops disposed on opposite sides of the brake cylinder/brake piston unit. Guiding bolts, which are fixed in a detachable manner to the brake carrier, extend through the loops and, thus, axially guide the floating caliper. The brake carrier has supporting sections, which axially reach beyond the brake disc on both sides of the caliper, directly supporting the brake shoes in the circumferential direction and radially in the direction towards the brake disc axis.

In a known spot-type disc brake of this type (German Patent DE-OS No. 2,538,017), the backing plates of the brake shoes rest in the circumferential direction against the supporting sections of the brake carrier so as to directly transmit the braking torques from the brake shoes to the brake carrier upon a braking action. Outside extensions of the backing plates extend beyond the supporting sections in order to additionally support the brake shoes against moving radially inwards. Outwardly, the brake shoes are only secured by being fastened at the floating caliper.

In a further known spot-type disc brake of this type (German Patent DE-OS No. 2,548,927), extensions of the backing plates reach beyond projections at the supporting sections of the brake carrier in a clamping manner so as to secure the backing plates both in the circumferential direction and in the radial direction inwardly and outwardly at the brake carrier. The floating caliper which is separately held by the guiding bolts, thus, only has to transmit the clamping forces to the brake shoes.

These known spot-type disc brakes have a disadvantage that the assembly and disassembly of the components thereof is relatively complicated. During the assembly, first, the brake shoes must be slid axially on to the supporting sections of the brake carrier, one after the other. Only then is it possible to radially mount the caliper from the outside and to fix it at the brake carrier by means of the guiding bolts.

SUMMARY OF THE INVENTION

An object of the present invention is to provide a spot-type disc brake having a simple guidance for the brake caliper and the brake shoes at the brake carrier, which allows easy manufacture and which avoids constraining forces. Another object of the present invention is to provide a spot-type disc brake enabling an easy assembly of the floating caliper and the brake shoes with the brake carrier, which preferably is already fastened to the vehicle, and at the same time provide a safe guidance and support of the brake shoes and the floating caliper at the brake carrier.

A feature of the present invention is the provision of a spot-type disc brake comprising a brake carrier rigidly fastened to a vehicle on one side of a rotatable brake disc, the carrier having two spaced supporting sections extending parallel to the rotational axis of the disc beyond the edge thereof; a floating caliper disposed between the two supporting sections embracing the disc, the caliper carrying on one side of the disc a brake actuating unit connected to an inside brake shoe and on the other side of the disc an outside brake shoe in a non-rotatably manner, the caliper having two spaced loops on opposite sides of the actuating unit, both of the inside and outside brake shoes being supported by the two supporting sections in a circumferential direction and in a radial direction toward the axis, the outside brake shoe having the leading side thereof radially outwardly confined by its associated one of the two supporting sections; and a pair of guiding bolts each detachably secured to the carrier and extending through a different one of the two loops to guide the caliper parallel to the rotational axis.

It has proved to be of particular advantage if, on the trailing side of the caliper, the outside brake shoe is radially outwardly liftable off the supporting section of the brake carrier. It is further expedient if, on the leading side of the caliper, the outside brake shoe is also radially inwardly supported at the supporting section of the brake carrier.

The essence of this invention thus includes the fact that the different kinematic arrangement of the floating caliper and of the outside brake shoe and the non-rotatable connection of these two components provide a positive connection between the floating caliper and the outside brake shoe in the radial direction. As long as the outside brake shoe is connected with the floating caliper, the guiding bolts being screwed into the brake carrier, the floating caliper will prevent the brake shoes from rotating around their guiding portion on the leading side of the caliper. The necessary support of the brake shoes in the radial direction will, thus, also be effected with the aid of the floating caliper. On the other hand, the outside shoe, due to it being supported at the brake carrier in both radial directions, will guide the floating caliper on the side of the brake disc which is remote from the actuation cylinder and will prevent the floating caliper from tilting around an axis which is transverse with respect to the guiding bolts. Rubber bushings are preferably provided in the loops formed in the caliper adjacent the actuating cylinder. These bushings are inserted between the floating caliper and the guiding bolts and, thus, the guiding bolts will be exposed to only a vertical strain with respect to their longitudinal axis and will not have to absorb any tilting movements of the brake caliper.

Preferably the inside brake shoe is also arranged at the supporting sections in the same way as the outside brake shoe.

A further advantageous embodiment is characterized in that the brake shoes have a groove on the leading side of the caliper and a recess on the trailing side of the caliper. The recess is radially outwardly closed, yet inwardly open, and the groove and the recess, respectively, are engaged, each from opposite sides, by a corresponding rib-like projection of the adjacent supporting section in a sliding fit, the projections pointing essentially in the direction of the main chord of the disc and engaging, respectively, the groove and the recess down to the bottom of the groove and the recess.

According to this invention the backing plate embraces the axial guiding projections on the leading side of the caliper, only, while on the trailing side of the caliper the backing plate embraces the guiding projection at the brake carrier supporting sections from above and in the circumferential direction, only. In this way, after the removal of the guiding bolts, it will be possible to remove the unit including the floating caliper and the brake shoes without any further difficulties from the brake carrier and the brake disc by means of lifting the unit on the trailing side of the caliper, i.e. by means of tilting it around the guiding portion on the leading side of the caliper, and by means of subsequently taking it out essentially in the direction of rotation of the disc. The assembly will be effected in a reverse manner. Regardless, the torques which will ensue at the brake shoes around the piston axis when driving forward will be absorbed completely by the guiding surfaces at the projections of the supporting sections, the guiding surfaces acting in the radial direction.

Only upon braking when driving backwards will there be no inner radially acting guiding surface available on the corresponding leading side of the caliper. Thus, in this case the corresponding tilting forces having to be partially transmitted to the brake carrier via the floating caliper and the guiding bolts. Since, however, there will be relatively few braking actions when driving backwards and since the then ensuing circumferential forces will be smaller, the inventive embodiment will deliberately accept this in the interest of a very economic manufacturability, particularly with respect to mass production. Servicing of the brake will also be facilitated considerably thanks to the inventive embodiment.

Thus, according to this invention, both brake shoes support themselves directly at the brake carrier via the backing plates by means of a prismatic guideway, on the leading side (referring to the usual forward journey), a radial positive engagement being achieved both outwardly and inwardly, while on the trailing side there will be a positive engagement inwardly, only. There will also be a positive engagement in both circumferential directions.

The groove and the recess advantageously have sliding surfaces arranged at right angles with respect to each other and running respectively parallel to and vertically with respect to the main chord of the disc. The main chord of the disc is defined as that chord of the disc which runs symmetrically with respect to the central axis of the piston connecting the two projections of the brake carrier supporting sections which are lying opposite each other in the circumferential direction.

Assembly and disassembly will further be facilitated by the fact that the projection engaging the groove has a roll-off front face. Preferably, this front face essentially is cylindrical, the cylinder axis extending in the axial direction. In particular, the cylinder axis is to be essentially positioned on the level of the inner sliding surface of the groove. Thus, between the projection's front face lying in the circumferential direction and the bottom of the groove a gore is formed which provides the required play for tilting in and out the unit including the floating caliper and brake shoes. Regardless, a perfect transmission of all forces is safeguarded upon braking when driving forward since on the trailing side of the caliper, in the circumferential direction, two plane and parallel surfaces of the projection or of the backing plate, respectively, are abutting each other. The line contact of the projection and of the groove bottom on the leading side of the caliper need not transmit any essential forces upon braking when driving forward.

Further, it will be particularly advantageous if at the outer sliding surface of the groove there is a contact in the form of an axial line, only. To this end the outer surface of the projection is inwardly chamfered relative to the outer sliding surface of the groove, preferably opposite the direction of rotation of the disc.

The point contact on the outside is expedient, since corrosion problems will be counteracted. Further, expediently, in the radial direction there is still a certain play of, e.g. 0.4 to 0.7 mm (millimeter) between the projection and the radially acting walls of the groove.

It is further essential that the inner sliding surface of the projection on the leading side run parallel to the chord and the inner sliding surface of the groove, since at this point torques of the brake shoes will have to be absorbed upon braking when driving forward.

The guiding bolts are preferably passed through elastic rubber bushings in the loops in order to provide the caliper with a certain elastic movability and to thus relieve the caliper from braking torques and other forces.

The outside brake shoe is preferably non-rotatably connected with the floating caliper in a detachable manner, while the inside brake shoe may likewise be connected with the floating caliper in a detachable manner. The inside brake shoe may be connected with the brake piston by means of a claw spring provided with a force which is directed towards the center of the wheel.

It will be particularly advantageous if the projection on the trailing side of the caliper is radially longer than that on the leading side of the caliper. Thereby, a faulty assembly of the unit including the floating caliper and the brake shoes will positively be avoided.

A structurally particularly expedient embodiment will be achieved if the groove and the recess, respectively, are formed at extensions which are laterally branching off outwardly in an angular manner in the upper area of the backing plates. In this way it will be ensured that the curvature of the floating caliper, which is adapted to that of the disc, via the respective extensions, will evenly pass over into the curvature of the supporting sections of the brake carrier. Thus, the structural space available within the wheel dish will be used optimally.

BRIEF DESCRIPTION OF THE PREFERRED EMBODIMENT

Above-mentioned and other features and objects of this invention will become more apparent by reference to the following description taken in conjunction with the accompanying drawing, in which.

DESCRIPTION OF THE PREFERRED EMBODIMENT

Figure 1:
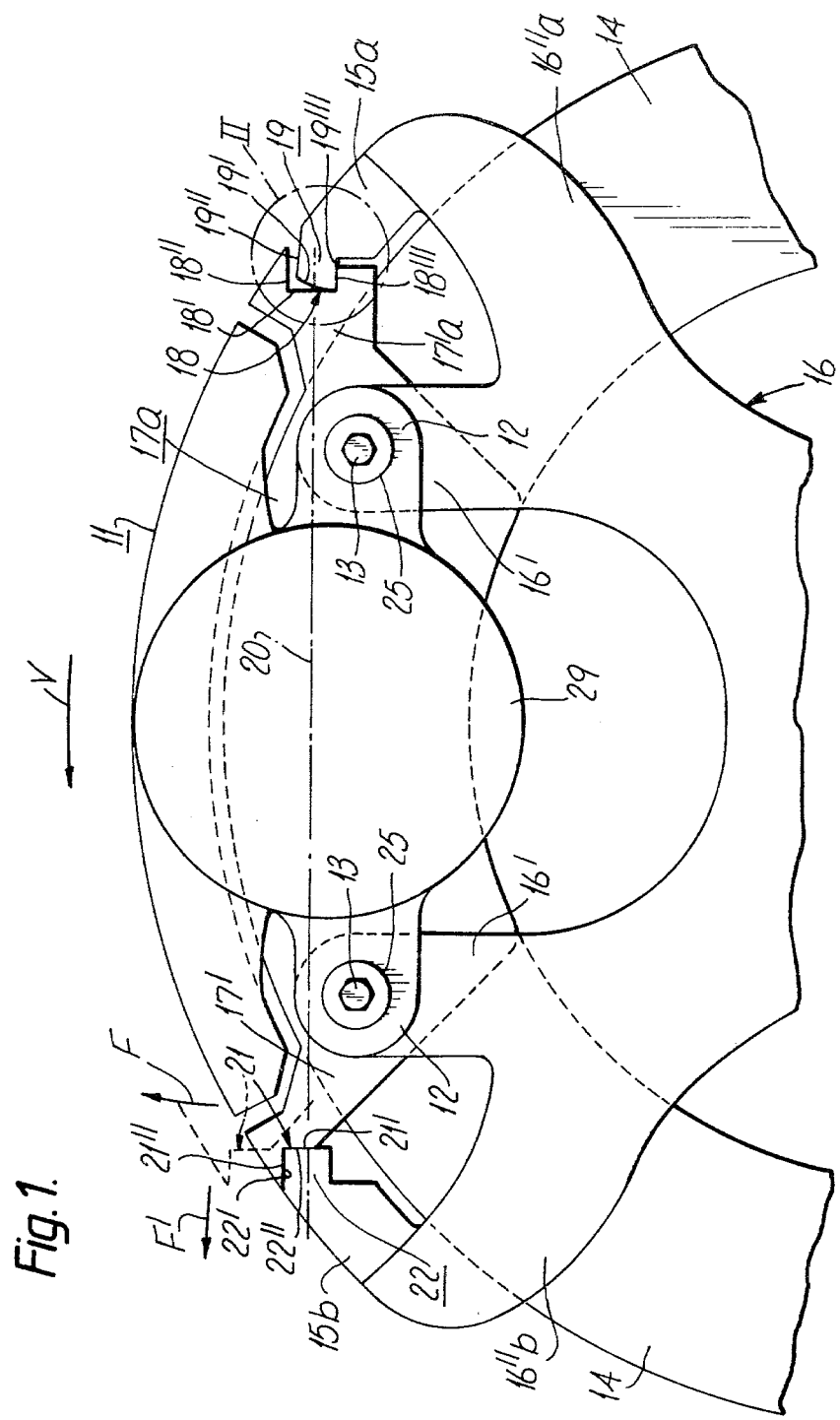
FIG. 1 is an axial view of a spot-type disc brake in accordance with the principles of the present invention.

In accordance with the drawing, the brake carrier 16 of a spot-type disc brake is fixed in the usual manner (not shown) at the steering knuckle, or at another component which is fixed to the motor vehicle. FIG. 1 is an axial view of the inside of the brake, on which the essential portion of the brake carrier 16 is rested. Two arms 16' of brake carrier 16 extend approximately radially outward to a point just short of the edge of the brake disc 14. Adjacent these ends of arms 16' an axial thread is provided into which guiding bolts 13 may be screwed from the inside.

Projections 16"a and 16"b of brake carrier 16 extend outward beyond the circumference of brake disc 14 on both the leading and the trailing sides of the caliper 11 and carry supporting sections 15a and 15b, respectively, which extend axially slightly beyond brake disc 14. At supporting sections 15a, 15b, projections 19 and 22, respectively, are provided, which according to the invention extend in the direction of the chord 20, and are likewise situated outside the outside edge of disc 14.

The brake components described above may already be integrated in the vehicle when manufacturing the vehicle, while the brake elements which will be described in the following may subsequently be mounted as a unit.

According to the drawing, a floating caliper 11 having a fist-like, or tong-like design, embraces brake disc 14. On the inside, the brake cylinder 29 with the brake piston 28 arranged therein is arranged at floating caliper 11. By means of a claw spring 27 (see FIG. 3), the inside brake shoe 30a is fastened to brake piston 28, brake shoe 30a comprising a backing plate 17a and the brake lining 28a. Thanks to the connection between brake shoe 30a and piston 28 by means of claw spring 27, tilting of piston 28 is avoided.

Figure 3:
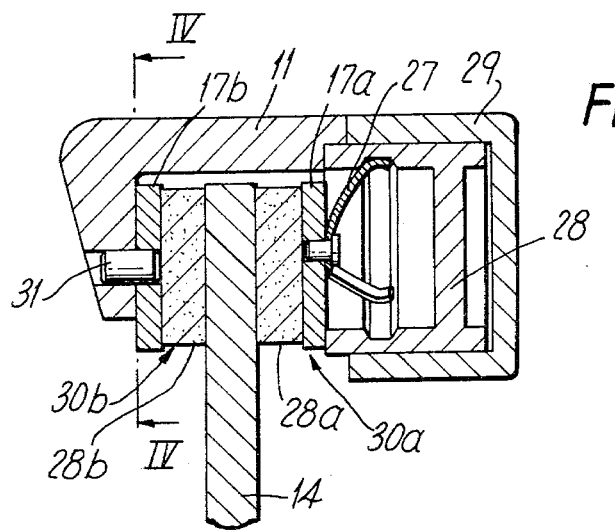
FIG. 3 is a longitudinal cross sectional view of the spot-type disc brake of FIG. 1.
Figure 4:
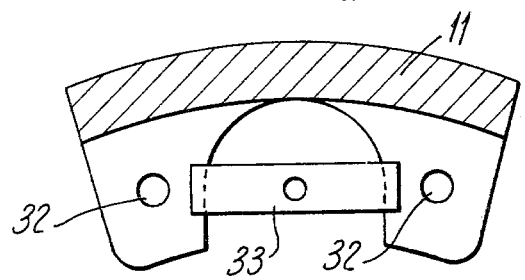
FIG. 4 is a cross sectional view along line IV—IV in FIG. 3.

The portion of floating caliper 11 which lies on the outside of disc 14 has the outside brake shoe 30b fastened thereto as shown in FIG. 3. Brake shoe 30b comprises a backing plate 17b and the brake lining 28b. According to FIGS. 3 and 4, at the two end areas of backing plate 17b which are lying in the circumferential direction, bolts 31 engage corresponding fitting bores 32 at the outer arm of floating caliper 11 which embraces brake disc 14. Due to this engagement, a non-rotatable connection is safeguarded between brake shoe 30b and floating caliper 11. A leaf spring 33 may additionally ensure the firm fastening of outside brake shoe 30b to floating caliper 11.

Finally, according to FIG. 1, the inventive unit including floating caliper 11 and brake shoes 30a and 30b has loops 12 provided laterally beside cylinder 29. Loops 12 have inserted therein rubber bushings 25 through which guiding bolts 13 extend. The distance between loops 12 corresponds to the distance between guiding bolts 13 screwed into brake carrier projections 16'.

Figure 2:
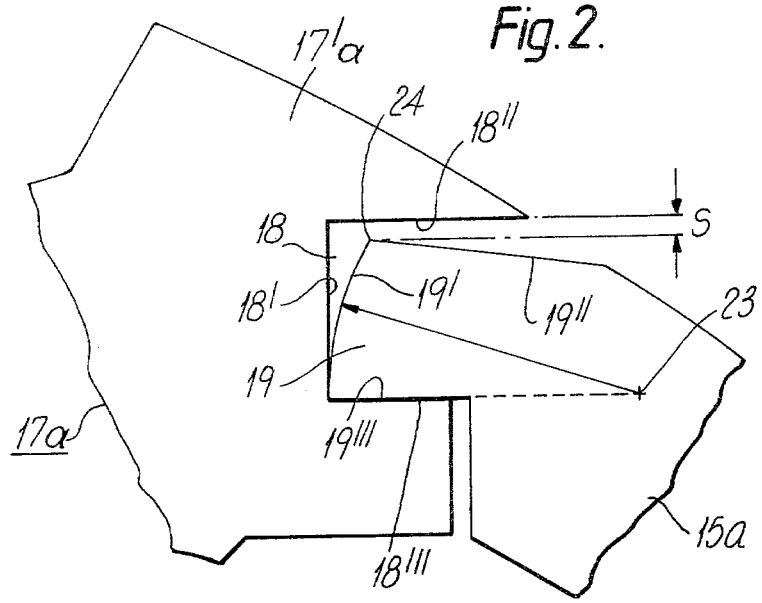
FIG. 2 is an enlarged, detailed view of a portion II of the outside brake shoe and of the brake carrier of FIG. 1.

According to FIGS. 1 and 2, the backing plates 17a and 17b of brake shoes 30a and 30b have extensions 17' and 17'a which are laterally extending outwardly in an angular manner and which, according to the invention, are designed in a very specific way.

In the embodiment of the drawing it is assumed that brake disc 14 will rotate in the direction of the arrow V when the vehicle is driving forward. The leading side of the caliper of the brake is thus the right-hand side in FIG. 1 and the trailing side of the caliper is the left-hand side in FIG. 1.

On the leading side of the caliper, in the extension 17'a, of the backing plate 17a and 17b a groove 18 is formed. According to FIGS. 1 and 2, projection 19 of the brake carrier supporting section 15a essentially engages groove 18 in a sliding fit. Groove 18 has a bottom 18', which essentially extends in the radial direction, and lateral guiding surfaces 18" and 18'" which extend at right angles with respect to bottom 18'. The inner guiding surface 18'" cooperates with an inner guiding surface 19'" of projection 19. Guiding surface 19'" is arranged parallel with guiding surface 18'", whereas bottom 18' of groove 18 cooperates with a roll-off surface 19' of projection 19, the center of curvature of roll-off surface 19' being at 23. Thus, a gore is formed which is important for the operation of the invention and which becomes particularly evident from FIG. 2.

The outer surface 19" of projection 19 extends in an angular manner with respect to the upper guiding surface 18" of groove 18 as is evident from FIG. 2. Thus, at this point there will only be a line contact between projection 19 and the extension 17'a along an axial line 24. However, between line 24 and guiding surface 18", the invention still provides a play S of about 0.4 to 0.7 mm.

On the trailing side of the caliper there is only a rectangular recess 21 provided at the end of the extensions 17' of backing plates 17a and 17b. This recess 21 has an approximately radial guiding surface 21' essentially absorbing the braking torques and a guiding surface 21" acting radially outward. According to the invention, there is no lower radially acting guiding surface in this spot.

Projection 22 of the brake carrier supporting section 15b on the trailing side of the caliper has guiding surfaces 22' and 22" which extend parallel with surfaces 21' and 21", respectively.

Thus, for the invention it is important that on the trailing side of the caliper there be an even sliding guidance between guiding surfaces 21' and 22' and guiding surfaces 21" and 22", which are situated at right angles with respect to each other, while on the leading side of the caliper such an even sliding guidance is provided between the inner guiding surfaces 18'" and 19'", only.

The inventive spot-type disc brake will be assembled as described below.

While brake carrier 16 may already be manufactured together with the vehicle, the unit comprising floating caliper 11 and brake shoes 30a and 30b will be manufactured separately by e.g. a special brake manufacturer. The unit comprising floating caliper 11 and brake shoes 30a and 30b will then be mounted in the finished vehicle which also is already provided with brake disc 14, with the vehicle's wheel having been removed. At first, the unit will be slid radially on to brake disc 14. Thereupon, first, groove 18 will be mounted angularly on projection 19 from the outside and at first the upper area of roll-off surface 19' will engage bottom 18' of groove 18 near contact line 24. Now the unit will be tilted downwards, bottom 18' rolling off on roll-off surface 19' until the position is reached which is indicated by a broken line on the left of FIG. 1. Upon a further tilting down, recess 21 will come into engagement with projection 22. After this has been performed in the manner evident from FIG. 1 guiding bolts 13 will be passed axially through rubber bushings 25 and screwed into brake carrier projections 16'. On guiding bolts 13, brake caliper 11 may axially carry out the axial movements necessary during the operation of the brake and in particular when brake linings 28a and 28b are worn. Now the brake is operable.

When disassembling the unit comprising floating caliper 11 and brake shoes 30a and 30b, only guiding bolts 13 will have to be removed, whereupon the unit may be tilted out of and removed from the brake carrier 16 in the manner indicated by the arrows F,F'.

According to this invention outer lining 28b and outside brake shoe 30b, respectively, are connected with the outer arm of floating caliper 11 in a radially positive manner and in a non-rotatable way so as to prevent floating caliper 11 from twisting outwardly when guiding bolts 13 are mounted, the tiltability of floating caliper 11 then only being possible in the area of the radial play of the prismatic guideway 18, 19 on the leading side of the caliper.

Upon braking when driving forward, linings 28a and 28b will be applied radially inwardly on the leading side and radially outwardly on the trailing side, due to the resulting torque at floating caliper 11, i.e. they will be applied opposite the direction of diassembly. Thus, then the unit comprising floating caliper 11 and brake shoes 30a and 30b will be pressed even more firmly into brake carrier 16.

The inner lining 28a is connected with piston 28 by means of claw spring 27 provided with a force directed inwardly. If floating caliper 11 is not mounted, lining 28a may only rotate around the axis of cylinder 29. After the assembly of caliper 11, however, the radial positive engagement of the shoe support will prevent this movement on the leading side. On the trailing side, the force of spring 27 will be radially applied to the lining on the outside, thus a definite position will also result in that respect.

Rubber bushings 25 in the loops of floating caliper 11 further have the advantage that guiding bolts 13 may already be inserted in rubber bushings 25 before the assembly so that they may be tightened immediately after the assembly of floating caliper 11. What is of specific importance with regard to the subject matter of the invention is that after the assembly of unit no springs will have to be fastened thereto. Thanks to the fact that in the radial direction projection 22 is thicker than projection 19 as faulty assembly will be impossible. It is further essential that backing plates 17a and 17b be of the same design.

The upper guiding surface 19" of the projection 19 is plane. When the brake has been assembled, upper guiding surface 19" will be placed at such an angle with respect to outer guiding surface 18" of groove 18 that during tilting of floating caliper 11 out of brake carrier 16 surfaces 18" and 19" will be parallel at that moment when sliding surface 21' of recess 21 has disengaged from the counter guiding surface 22' of projection 22.

While I have described above the principles of my invention in connection with specific apparatus it is to be clearly understood that this description is made only by way of example and not as a limitation to the scope of my invention as set forth in the objects thereof and in the accompanying claims.

I claim:
1. A spot-type disc brake comprising:
a brake carrier rigidly fastened to a vehicle on one side of a rotatable brake disc, said carrier having two spaced supporting sections extending parallel to a rotational axis of said disc outside the edge thereof;
a floating caliper disposed between said two supporting sections embracing said disc, said caliper carrying on one side of said disc a brake actuating unit connected to an inside brake shoe and on the other side of said disc an outside brake shoe in a non-rotatable manner, said caliper having two spaced loops disposed on opposite sides of said actuating unit and between said rotational axis and the edge of said disc, both of said inside and outside brake shoes being supported by said two supporting sections in a circumferential direction and in a radial direction toward said axis, said outside brake shoe having the leading side thereof radially outwardly confined by its associated one of said two supporting sections and the trailing side thereof radially outwardly unconfined by its associated one of said two supporting sections; and
a pair of guiding bolts each detachably secured to said carrier between said rotational axis and the edge of said disc and extending through a different one of said two loops to guide said caliper parallel to said rotational axis.

2. A brake according to claim 1, wherein
the trailing side of said outside brake shoe is radially outwardly liftable off its associated one of said two supporting sections.

3. A brake according to claim 2, wherein
said leading side of said outside brake shoe is radially inwardly supported by its associated one of said two supporting sections.

4. A brake according to claim 3, wherein
said inside brake shoe is supported by said two supporting sections in the same way as said outside brake shoe.

5. A brake according to claim 4, wherein
each of said brake shoes include a backing plate having a groove on said leading side and a recess on said trailing side, said recess being radially outwardly closed and inwardly opened, said groove and said recess being engaged from opposite sides in a sliding fit by a different one of a pair of rib-like projections each projecting from an associated one of said two supporting sections along a main chord of said disc and engaging their associated one of said groove and said recess down to the bottom thereof.

6. A brake according to claim 5, wherein
said groove has a first sliding surface perpendicular to said chord and second and third sliding surfaces parallel to said chord and spaced with respect to each other, and
said recess has a fourth sliding surface perpendicular to said chord and a fifth sliding surface parallel to said chord to close said recess radially outwardly.

7. A brake according to claim 6, wherein
that one of said pair of projections engaging said groove has a roll-off end surface.

8. A brake according to claim 7, wherein
said roll-off surface is cylindrical having a cylindrical axis parallel to said rotational axis and a radius of curvature twice as long as the width of said groove.

9. A brake according to claim 8, wherein
said cylinder axis is disposed on the level of the inner one of said second and third sliding surfaces.

10. A brake according to claim 9, wherein
the outer one of said second and third sliding surfaces and the outer surface of that one of said pair of projections engaging said groove have a line contact parallel to said rotational axis.

11. A brake according to claim 10, wherein
the outer surface of that one of said pair of projections engaging said groove is inwardly inclined away from said roll-off surface relative to the outer one of said second and third sliding surfaces.

12. A brake according to claim 11, wherein the inner surface of that one of said pair of projections engaging said groove is parallel to said chord and the inner one of said second and third sliding surfaces.

13. A brake according to claim 12, wherein each of said guiding bolts is passed through an elastic bushing in an associated one of said loops.

14. A brake according to claim 13, wherein said outside brake shoe is non-rotatably connected to said caliper in a detachable manner.

15. A brake according to claim 14, wherein said inside brake shoe is detachably connected to said caliper.

16. A brake according to claim 15, wherein said inside brake shoe is connected to a piston of said actuating unit by a claw spring having a force directed toward said rotational axis.

17. A brake according to claim 16, wherein that one of said pair of projections engaging said recess is radially wider than that one of said pair of projections engaging said groove.

18. A brake according to claim 17, wherein said groove and said recess are provided in extensions of said backing plates branching therefrom outwardly in an angular manner from the upper area of said backing plates.

19. A brake according to claim 5, wherein that one of said pair of projections engaging said recess is radially wider than that one of said pair of projections engaging said groove.

20. A brake according to claim 19, wherein said groove and said recess are provided in extensions of said backing plates branching therefrom outwardly in an annular manner from the upper area of said backing plates.

21. A brake according to claim 5, wherein said groove and said recess are provided in extensions of said backing plates branching therefrom outwardly in an angular manner from the upper area of said backing plates.

22. A brake according to claim 1, wherein said leading side of said outside brake shoe is radially inwardly supported by its associated one of said two supporting sections.

23. A brake according to claim 22, wherein said inside brake shoe is supported by said two supporting sections in the same way as said outside brake shoe.

24. A brake according to claim 23, wherein each of said brake shoes include a backing plate having a groove on said leading side and a recess on said trailing side, said recess being radially outwardly closed and inwardly opened, said groove and said recess being engaged from opposite sides in a sliding fit by a different one of a pair of rib-like projections each projecting from an associated one of said two supporting sections along a main chord of said disc and engaging their associated one of said groove and said recess down to the bottom thereof.

25. A brake according to claim 24, wherein said groove has a first sliding surface perpendicular to said chord and second and third sliding surfaces parallel to said chord and spaced with respect to each other, and said recess has a fourth sliding surface perpendicular to said chord and a fifth sliding surface parallel to said chord to close said recess radially outwardly.

26. A brake according to claim 25, wherein that one of said pair of projections engaging said groove has a roll-off end surface.

27. A brake according to claim 26, wherein said roll-off surface is cylindrical having a cylinder axis parallel to said rotational axis and a radius of curvature twice as long as the width of said groove.

28. A brake according to claim 27, wherein said cylinder axis is disposed on the level of the inner one of said second and third sliding surfaces.

29. A brake according to claim 28, wherein the outer one of said second and third sliding surfaces and the outer surface of that one of said pair of projections engaging said groove have a line contact parallel to said rotational axis.

30. A brake according to claim 29, wherein the outer surface of that one of said pair of projections engaging said groove is inwardly inclined away from said roll-off surface relative to the outer one of said second and third sliding surfaces.

31. A brake according to claim 30, wherein the inner surface of that one of said pair of projections engaging said groove is parallel to said chord and the inner one of said second and third sliding surfaces.

32. A brake according to claim 31, wherein each of said guiding bolts is passed through an elastic bushing in an associated one of said loops.

33. A brake according to claim 32, wherein said outside brake shoe is non-rotatably connected to said caliper in a detachable manner.

34. A brake according to claim 33, wherein said inside brake shoe is detachably connected to said caliper.

35. A brake according to claim 34, wherein said inside brake shoe is connected to a piston of said actuating unit by a claw spring having a force directed toward said rotational axis.

36. A brake according to claim 35, wherein that one of said pair of projections engaging said recess is radially wider than that one of said pair of projections engaging said groove.

37. A brake according to claim 36, wherein said groove and said recess are provided in extensions of said backing plates branching therefrom outwardly in an angular manner from the upper area of said backing plates.

38. A brake according to claim 24, wherein that one of said pair of projections engaging said recess is radially wider than that one of said pair of projections engaging said groove.

39. A brake according to claim 38, wherein said groove and said recess are provided in extensions of said backing plates branching therefrom outwardly in an angular manner from the upper area of said backing plates.

40. A brake according to claim 24, wherein said groove and said recess are provided in extensions of said blocking plates branching therefrom outwardly in an angular manner from the upper area of said backing plates.

41. A brake according to claim 1, wherein said inside brake shoe is supported by said two supporting sections in the same way as said outside brake shoe.

42. A brake according to claim 41, wherein
each of said brake shoes include a backing plate having a groove on said leading side and a recess on said trailing side, said recess being radially outwardly closed and inwardly opened, said groove and said recess being engaged from opposite sides in a sliding fit by a different one of a pair of rib-like projections each projecting from an associated one of said two supporting sections along a main chord of said disc and engaging their associated one of said groove and said recess down to the bottom thereof.

43. A brake according to claim 42, wherein
said groove has a first sliding surface perpendicular to said chord and second and third sliding surfaces parallel to said chord and spaced with respect to each other, and
said recess has a fourth sliding surface perpendicular to said chord and a fifth sliding surface parallel to said chord to close said recess radially outwardly.

44. A brake according to claim 43, wherein
that one of said pair of projections engaging said groove has a roll-off end surface.

45. A brake according to claim 44, wherein
said roll-off surface is cylindrical having a cylinder axis parallel to said rotational axis and a radius of curvature twice as long as the width of said groove.

46. A brake according to claim 45, wherein
said cylinder axis is disposed on the level of the inner one of said second and third sliding surfaces.

47. A brake according to claim 46, wherein
the outer one of said second and third sliding surfaces and the outer surface of that one of said pair of projections engaging said groove have a line contact parallel to said rotational axis.

48. A brake according to claim 47, wherein
the outer surface of that one of said pair of projections engaging said groove is inwardly inclined away from said roll-off surface relative to the outer one of said second and third sliding surfaces.

49. A brake according to claim 48, wherein
the inner surface of that one of said pair of projections engaging said groove is parallel to said chord and the inner one of said second and third sliding surfaces.

50. A brake according to claim 49, wherein
each of said guiding bolts is passed through an elastic bushing in an associated one of said loops.

51. A brake according to claim 50, wherein
said outside brake shoe is non-rotatably connected to said caliper in a detachable manner.

52. A brake according to claim 51, wherein
said inside brake shoe is detachably connected to said caliper.

53. A brake according to claim 52, wherein
said inside brake shoe is connected to a piston of said actuating unit by a claw spring having a force directed toward said rotational axis.

54. A brake according to claim 53, wherein
that one of said pair of projections engaging said recess is radially wider than that one of said pair of projections engaging said groove.

55. A brake according to claim 54, wherein
said groove and said recess are provided in extensions of said backing plates branching therefrom outwardly in an angular manner from the upper area of said backing plates.

56. A brake according to claim 43, wherein
that one of said pair of projections engaging said recess is radially wider than that one of said pair of projections engaging said groove.

57. A brake according to claim 56, wherein
said groove and said recess are provided in extensions of said backing plates branching therefrom outwardly in an angular manner from the upper area of said backing plates.

58. A brake according to claim 1, wherein
each of said guiding bolts is passed through an elastic bushing in an associated one of said loops.

59. A brake according to claim 58, wherein
said outside brake shoe is non-rotatably connected to said caliper in a detachable manner.

60. A brake according to claim 59, wherein
said inside brake shoe is detachably connected to said caliper.

61. A brake according to claim 60, wherein
said inside brake shoe is connected to a piston of said actuating unit by a claw spring having a force directed toward said rotational axis.

62. A brake according to claim 1, wherein
said outside brake shoe is non-rotatably connected to said caliper in a detachable manner.

63. A brake according to claim 62, wherein
said inside brake shoe is detachably connected to said caliper.

64. A brake according to claim 63, wherein
said inside brake shoe is connected to a piston of said actuating unit by a claw spring having a force directed toward said rotational axis.

65. A brake according to claim 1, wherein
said inside brake shoe is detachably connected to said caliper.

66. A brake according to claim 65, wherein
said inside brake shoe is connected to a piston of said actuating unit by a claw spring having a force directed toward said rotational axis.

67. A brake according to claim 1, wherein
said inside brake shoe is connected to a piston of said actuating unit by a claw spring having a force directed toward said rotational axis.

* * * * *